W. L. MARTIN

March 12, 1929. DRIER Re. 17,236

2 Sheets-Sheet 1

Original Filed July 28, 1926

Wendell L. Martin
Inventor
by Smith and Freeman
Attorneys

March 12, 1929.

W. L. MARTIN

DRIER

Re. 17,236

Original Filed July 28, 1926

2 Sheets-Sheet 2

Wendell L. Martin
Inventor
by Smith and Freeman
Attorneys

Reissued Mar. 12, 1929.

Re. 17,236

UNITED STATES PATENT OFFICE.

WENDELL L. MARTIN, OF CLEVELAND, OHIO, ASSIGNOR TO THE MARTIN BROTHERS ELECTRIC COMPANY, OF CLEVELAND, OHIO, A CORPORATION OF OHIO.

DRIER.

Original No. 1,660,802, dated February 28, 1928, Serial No. 125,471, filed July 28, 1926. Application for reissue filed July 23, 1928. Serial No. 294,860.

My invention relates to driers and the principal object of my invention is to provide a new and improved device of this type. In the drawings accompanying this specification and forming a part of this application I have shown, for purposes of illustration, one form which my invention may assume. In these drawings:

Figure 2 is a horizontal section taken on the line 2—2 of Figure 1, and enlarged, while

Figure 1:
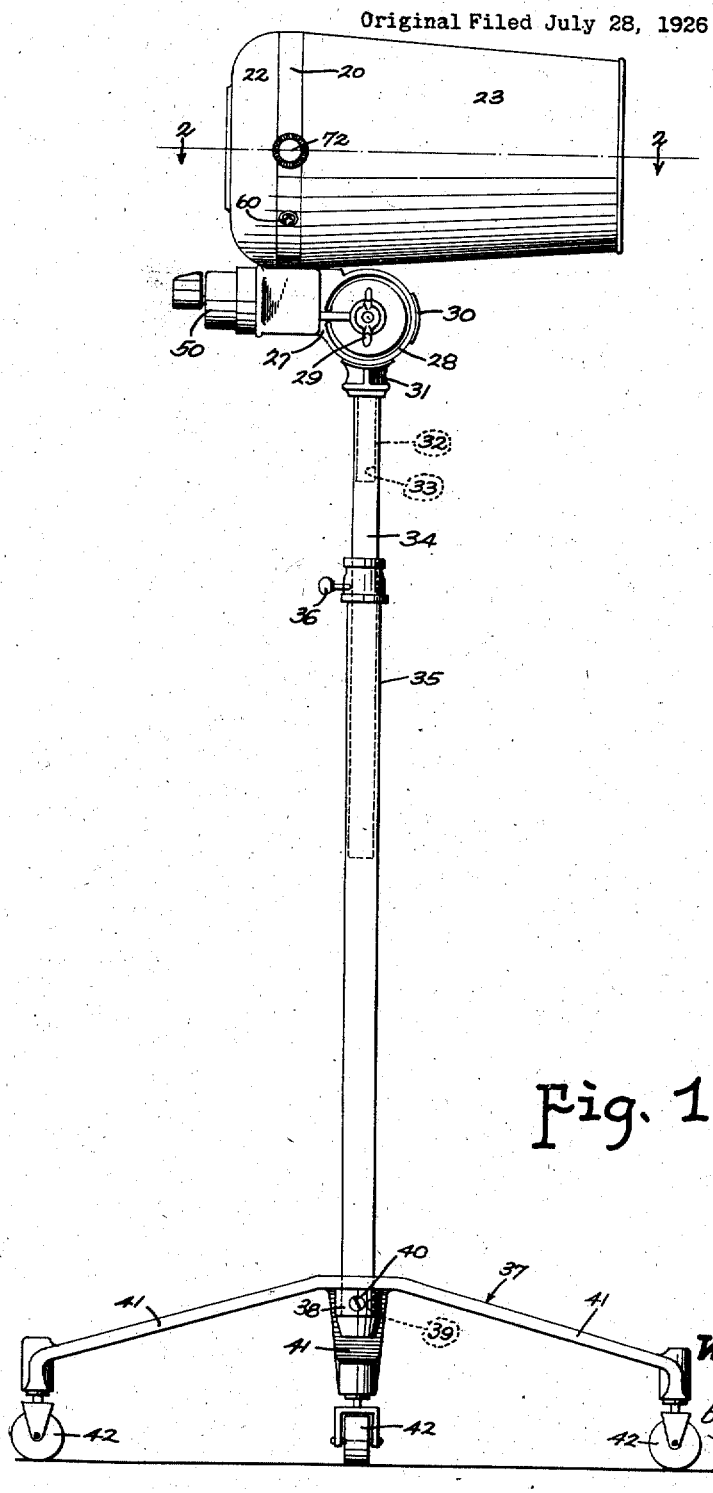
Figure 1 is a general view of this illustrative embodiment of my invention.
Figure 2:
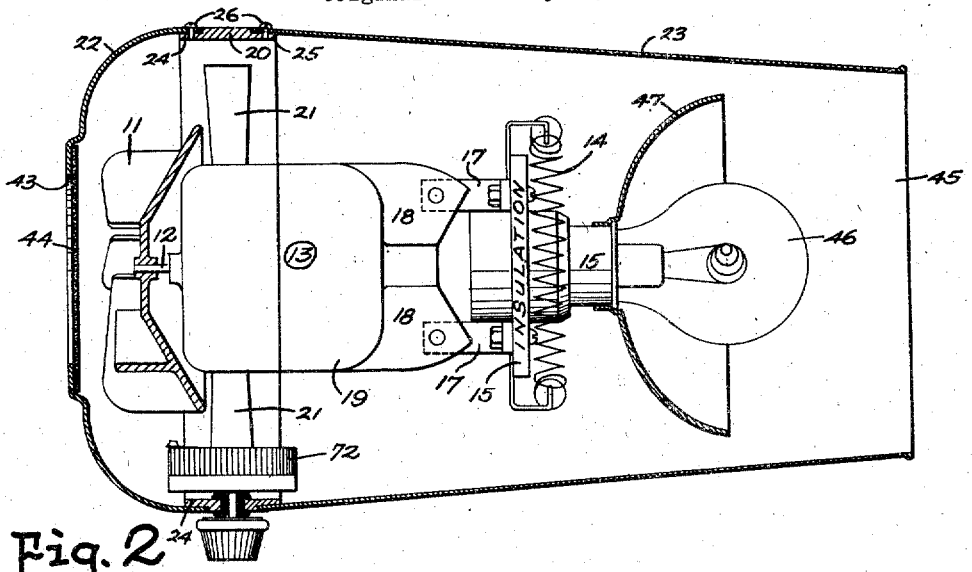
Figure 3:
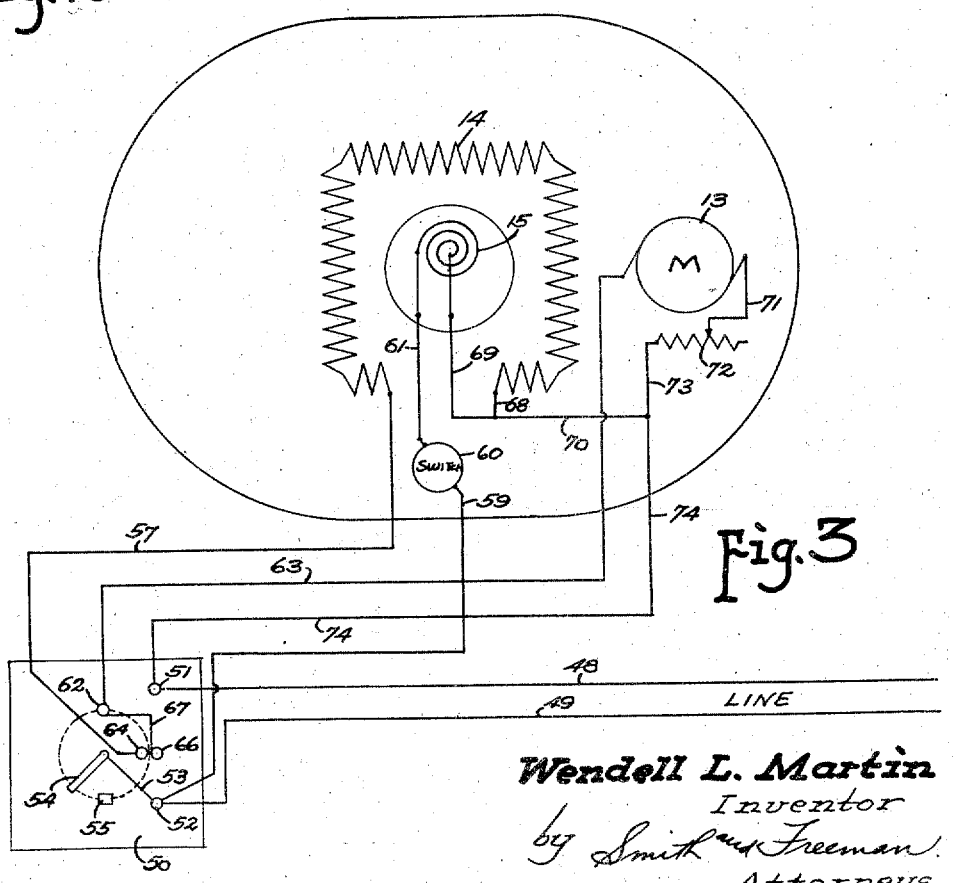
Figure 3 is a diagrammatic representation of the electrical system.

The embodiment of my invention herein shown comprises a fan 11 secured to one end of the shaft 12 of a motor 13 which carries at its forward end a heater 14 and a lamp socket 15 both supported upon an insulating base 16 carried by two arms 17 extending outwardly from lugs 18 formed on the housing 19 of the motor 13, the entire fan-motor-heater-socket unit being supported from a supporting ring 20 by means of radial ribs 21 extending between the motor housing 19 and the supporting ring 20. The entire unit is enclosed by a pair of casing sections 22 and 23 which overlie reduced shoulders 24 and 25 formed respectively on the rear and forward sides of the supporting ring 20, and are secured to the ring 20 in any suitable manner, as by set screws 26 extending through the casing sections 22 and 23 into the reduced shoulders 24 and 25 respectively, and the supporting ring 20, and the entire unit carried thereby, including the casing sections 22 and 23, are supported by means of a bracket 27 integral with the supporting ring 20 and itself provided with a circular projection 28 adapted to be held by means of a bolt 29 in cooperating pivotal relation to a similar circular projection 30 carried by a block 31 provided with a pin 32 arranged to be rotatably received by any suitable socket, such as the recess 33 extending downwardly into the top of a shank 34 itself arranged to be received within the bore of a stem 35 which is provided with a set screw 36 to lock the shank 34 in adjusted position and is itself supported from a base 37 having a central annular portion 38 provided with a recess 39 for the reception of the lower end of the stem 35, having a set screw 40 to hold the stem 35 in position in the base 37, and provided with three legs 41 each provided with a roller or caster 42.

The casing section 22 is provided with an inlet opening 43 closed by means of a wire screen 44, the casing section 23 is provided with an outlet opening 45, the socket 15 is provided with a lamp 46, and with a reflector 47 directing the light and heat from the lamp 46 through the outlet opening 45, and the various parts of the drier, including the fan 11, and the casing sections 22 and 23, and the ribs 21, and the motor casing 13, and the heater 14, and the reflector 17, and the opening 45, are all so formed and proportioned and positioned that the air drawn in by the fan 11 through the opening 43 in the casing section 22 is given a rotating or swirling motion which is permitted to persist throughout the entire length of the casing 23 so that the air emerges through the opening 45 still swirling and only at the periphery of the opening 45, and there is produced a secondary air current flowing into the opening 45 through the center of the swirl drawn in by the suction produced by the swirl itself.

Operating power for the entire unit is provided through a pair of line wires 48 and 49 connected to a main switch 50 provided with a first terminal 51 receiving the line wire 48, and with a second terminal 52 receiving the line wire 49, connected by means of a conductor 59 to a switch 60 in turn connected by a conductor 61 to one terminal of the lamp 15, and also connected by means of a conductor 53 to a switch arm 54 having three operating positions in the first of which it engages a blank contact 55, in the second of which it engages a terminal 62 connected by means of a conductor 63 to one terminal of the motor 13, and in the third of which it engages a first terminal 66 connected by means of a conductor 67 to the terminal 62, and a second terminal 64 connected by means of a conductor 57 to one terminal of the heater 14, the other terminal of the heater 14 and the other terminal of the lamp 15 being connected by branch conductors 68 and 69 to a sub-conductor 70, the other terminal of the motor 13 being connected by means of a conductor 71 to a resistance 72 having its second terminal connected to a sub-conductor 73, and the two sub-conductors 70 and 73 being connected by means of a conductor 74 to the terminal 51 of the switch 50.

From the above description it will be understood by those skilled in the art that by placing the switch 50 in the second position I energize the motor 13 and fan 11 without energization of the heater 14, and that with the switch 50 in the third position I energize both the motor 13 and fan 11, and also the heater 14, and that the lamp 15 may be energized at any time independently of the energization of either the motor 13 or the heater 14, and depending only on the position of the switch 60.

Under these circumstances those familiar with driers of this type, and with the use thereof, for drying hair, will appreciate that I can secure the operation of any of the three devices or any combination of the three devices, likely to be desired for that purpose, and also that by virtue of the air currents set up by the embodiment of my invention herein shown and described I can produce an air current which flows from the drier in a gentle expanding stream flowing outwardly about the head and then returning through the hair itself to supply the air drawn in through the center of the swirl.

Under these circumstances those skilled in the art will appreciate that I have produced a new and improved drier.

At the same time those skilled in the art will realize that the particular embodiment of my invention herein shown and described may be variously changed and modified without departing from the spirit of my invention or sacrificing the advantages thereof and it will therefore be understood that the disclosure herein is illustrative only and that my invention is not limited thereto.

I claim:

1. A blower comprising a casing provided with an outlet, and with an inlet remote from said outlet, and a fan disposed within said casing arranged to draw air in through said inlet, and to impart a swirl to such air, and to expel such air through said outlet, said blower being formed and constituted not to interrupt such swirl, and said outlet being formed tubular, to cause such swirl to persist, and to cause such air to emerge from said outlet swirling and only about the periphery of said opening, and to draw in additional air from exteriorly of said casing through the center of such swirl.

2. A blower comprising a casing provided with an opening, a fan disposed within said casing arranged to impart a swirl to the air reaching said fan, and to expel such air through said opening, and a heating element disposed within said casing in the path of such air between said fan and said opening, said blower, including said heating element, being formed and constituted not to interrupt such swirl, and said opening being formed tubular, to cause such swirl to persist, and to cause such air to emerge from said opening swirling and only about the periphery of said opening, and to draw in air from exteriorly of said casing through the center of such swirl.

3. A blower comprising a casing provided with an outlet, and with an inlet remote from said outlet, a fan disposed within said casing arranged to draw air in through said inlet, and to impart a swirl to such air, and to expel such air through said outlet, and a heating element disposed within said casing in the path of such air between said fan and said outlet, said blower, including said heating element, being formed and constituted not to interrupt such swirl, and said outlet being formed tubular, to cause such swirl to persist, and to cause such air to emerge from said outlet swirling and only about the periphery of said opening, and to draw in additional air from exteriorly of said casing through the center of such swirl.

4. A blower comprising a casing provided with an outlet, and with an inlet remote from said outlet, a fan disposed within said casing arranged to draw air in through said inlet, and to impart a swirl to such air, and to expel such air through said outlet, and an electric bulb disposed within said casing in position to throw light through said outlet, said blower, including said bulb, being formed and constituted not to interrupt such swirl, and said outlet being formed tubular, to cause such swirl to persist, and to cause such air to emerge from said outlet swirling and only about the periphery of said opening, and to draw in additional air from exteriorly of said casing through the center of such swirl.

5. A blower comprising a casing provided with an opening, a fan disposed within said casing arranged to impart a swirl to the air reaching said fan, and to expel such air through said opening, a heating element disposed within said casing in the path of such air between said fan and said opening, and an electric bulb disposed within said casing in position to throw light through said opening, said blower, including said heating element and said bulb, being formed and constituted not to interrupt such swirl, and said opening being formed tubular, to cause such swirl to persist, and to cause such air to emerge from said opening swirling and only about the periphery of said opening, and to draw in air from exteriorly of said casing though the center of such swirl.

6. A blower comprising a casing provided with an outlet, and with an inlet remote from said outlet, a fan disposed within said casing arranged to draw air in through said inlet, and to impart a swirl to such air, and to expel such air through said outlet, a heating element disposed within said casing in the path of such air between said fan and said outlet, and an electric bulb disposed within said casing in position to throw its light through said outlet, said blower, including said heating element and said bulb, being formed and constituted not to interrupt such swirl, and said outlet being formed tubular, to cause such swirl to persist, and to cause such air to emerge from said outlet swirling and only about the periphery of said opening, and to draw in additional air from exteriorly of said casing through the center of such swirl.

7. A blower, comprising a casing provided with an outlet, and with an inlet remote from said outlet, and a fan disposed within said casing arranged to draw air in through said inlet, and to impart a swirl to such air, and to expel such air through said outlet, said blower being formed and constituted not to interrupt such swirl, and said outlet being formed tubular, to cause such swirl to persist, and to cause such air to emerge from said outlet swirling, such swirling being of such degree as to cause such air to emerge from said outlet substantially only about the periphery of said outlet.

8. A blower, comprising a casing provided with an opening, a fan disposed within said casing arranged to impart a swirl to the air reaching said fan, and to expel such air through said opening, and a heating element disposed within said casing in the path of such air between said fan and said opening, said blower, including said heating element, being formed and constituted not to interrupt such swirl, and said opening being formed tubular, to cause such swirl to persist, and to cause such air to emerge from said opening swirling, such swirling being of such degree as to cause such air to emerge from said outlet substantially only about the periphery of said outlet.

9. A blower, comprising a casing provided with an outlet, and with an inlet remote from said outlet, a fan disposed within said casing arranged to draw air in through said inlet, and to impart a swirl to such air, and to expel such air though said outlet, and a heating element disposed within said casing in the path of such air between said fan and said outlet, said blower, including said heating element, being formed and constituted not to interrupt such swirl, and said outlet being formed tubular, to cause such swirl to persist, and to cause such air to emerge from said outlet swirling, such swirling being of such degree as to cause such air to emerge from said outlet substantially only about the periphery of said outlet.

10. A blower, comprising a casing provided with an outlet, and with an inlet remote from said outlet, a fan disposed within said casing arranged to draw air in through said inlet, and to impart a swirl to such air, and to expel such air through said outlet, and an electric bulb disposed within said casing in position to throw light through said outlet, said blower, including said bulb, being formed and constituted not to interrupt such swirl, and said outlet being formed tubular, to cause such swirl to persist, and to cause such air to emerge from said outlet swirling, such swirling being of such degree as to cause such air to emerge from said outlet substantially only about the periphery of said outlet.

11. A blower, comprising a casing provided with an opening, a fan disposed within said casing arranged to impart a swirl to the air reaching said fan, and to expel such air through said opening, a heating element disposed within said casing in the path of such air between said fan and said opening, and an electric bulb disposed within said casing in position to throw light through said opening, said blower, including said heating element and said bulb, being formed and constituted not to interrupt such swirl, and said opening being formed tubular, to cause such swirl to persist, and to cause such air to emerge from said opening swirling, such swirling being of such degree as to cause such air to emerge from said outlet substantially only about the periphery of said outlet.

12. A blower, comprising a casing provided with an outlet, and with an inlet remote from said outlet, a fan disposed within said casing arranged to draw air in through said inlet, and to impart a swirl to such air, and to expel such air through said outlet, a heating element disposed within said casing in the path of such air between said fan and said outlet, and an electric bulb disposed within said casing in position to throw its light through said outlet, said blower, including said heating element and said bulb, being formed and constituted not to interrupt such swirl, and said outlet being formed tubular, to cause such swirl to persist, and to cause such air to emerge from said outlet swirling, such swirling being of such degree as to cause such air to emerge from said outlet substantially only about the periphery of said outlet.

13. A blower, comprising a casing provided with an outlet, and with an inlet remote from said outlet, and a fan disposed within said casing arranged to draw air in through said inlet and to expel such air through said outlet, said blower being formed and constituted to impart a swirl to such air and not to interrupt such swirl, and having said outlet formed tubular to cause such swirl to persist, to cause such air to emerge from said outlet swirling, such swirling being of such degree as to cause such air to emerge from said outlet substantially only about the periphery of said outlet.

14. A blower, comprising a casing provided with an opening, a fan disposed within said casing arranged to expel air through said opening, and a heating element disposed within said casing in the path of such air between said fan and said opening, said blower being formed and constituted to impart a swirl to such air and not to interrupt such swirl, and having said opening formed tubular to cause such swirl to persist, to cause such air to emerge from said opening swirling, such swirling being of such degree as to cause such air to emerge from said outlet substantially only about the periphery of said outlet.

15. A blower, comprising a casing provided with an outlet, and with an inlet remote from said outlet, a fan disposed within said casing arranged to draw air in through said inlet and to expel such air through said outlet, and a heating element disposed within said casing in the path of such air between said fan and said outlet, said blower being formed and constituted to impart a swirl to such air and not to interrupt such swirl, and having said outlet formed tubular to cause such swirl to persist, to cause such air to emerge from said outlet swirling, such swirling being of such degree as to cause such air to emerge from said outlet substantially only about the periphery of said outlet.

16. A blower, comprising a casing provided with an outlet, and with an inlet remote from said outlet, a fan disposed within said casing arranged to draw air in through said inlet and to expel such air through said outlet, and an electric bulb disposed within said casing in position to throw light through said outlet, said blower being formed and constituted to impart a swirl to such air and not to interrupt such swirl, and said outlet being formed tubular to cause such swirl to persist, to cause such air to emerge from said outlet swirling, such swirling being of such degree as to cause such air to emerge from said outlet substantially only about the periphery of said outlet.

17. A blower, comprising a casing provided with an opening, a fan disposed within said casing arranged to expel air through said opening, a heating element disposed within said casing in the path of such air between said fan and said opening, and an electric bulb disposed within said casing in position to throw light through said opening, said blower being formed and constituted to impart a swirl to such air and not to interrupt such swirl, and having said opening formed tubular to cause such swirl to persist, to cause such air to emerge from said opening swirling, such swirling being of such degree as to cause such air to emerge from said outlet substantially only about the periphery of said outlet.

18. A blower, comprising a casing provided with an outlet, and with an inlet remote from said outlet, a fan disposed within said casing arranged to draw air in through said inlet and to expel such air through said outlet, a heating element disposed within said casing in the path of such air between said fan and said outlet, and an electric bulb disposed within said casing in position to throw its light through said outlet, said blower being formed and constituted to impart a swirl to such air and not to interrupt such swirl, and said outlet being formed tubular to cause such swirl to persist, to cause such air to emerge from said outlet swirling, such swirling being of such degree as to cause such air to emerge from said outlet substantially only about the periphery of said outlet.

19. A blower, comprising a casing provided with an outlet, and with an inlet remote from said outlet, a fan disposed within said casing arranged to draw air in through said inlet, and to impart a swirl to such air, and to expel such air through said outlet, and an electric bulb disposed within said casing spaced from the sides of said casing and substantially axial of said casing and in position to throw light through said outlet, said blower, including said bulb, being formed and constituted not to interrupt such swirl, and said outlet being formed tubular, to cause such swirl to persist, and to cause such air to emerge from said outlet swirling, such swirling being of such degree as to cause such air to emerge from said outlet substantially only about the periphery of said outlet.

20. A blower, for drying hair, comprising a casing provided with an outlet, and with an inlet remote from said outlet, a fan disposed within said casing arranged to draw air in through said inlet and to expel such air through said outlet, and an electric bulb disposed within said casing in position to throw light through said outlet, said blower being formed and constituted to impart a swirl to such air and not to interrupt such swirl, and said outlet being formed tubular to cause such swirl to persist, to cause such air to emerge from said outlet swirling to an extent sufficient to lift the hair.

21. A blower, for drying hair, comprising a casing provided with an outlet, and with an inlet remote from said outlet, a fan disposed within said casing arranged to draw air in through said inlet, and to impart a swirl to such air, and to expel such air through said outlet, and an electric bulb disposed within said casing in position to throw light through said outlet, said blower, including said bulb, being formed and constituted not to interrupt such swirl, and having said outlet formed tubular to cause such swirl to persist, to cause such air to emerge from said outlet swirling to an extent sufficient to lift the hair.

22. A blower, comprising a casing provided with an opening, a fan disposed within said casing arranged to impart a swirl to the air reaching said fan, and to expel such air through said opening, and a heating element disposed within said casing spaced from the sides of said casing and substantially axial of said casing and in the path of such air between said fan and said opening, said blower, including said heating element, being formed and constituted not to interrupt such swirl, and said opening being formed tubular, to cause such swirl to persist, and to cause such air to emerge from said opening swirling, such swirling being of such degree as to cause such air to emerge from said outlet substantially only about the periphery of said outlet.

23. A blower, comprising a casing provided with an opening, a fan disposed within said casing arranged to impart a swirl to the air reaching said fan, and to expel such air through said opening, a heating element disposed within said casing in the path of such air between said fan and said opening, and an electric bulb disposed within said casing in position to throw light through said opening, said heating element and said bulb being spaced from the sides of said casing and substantially axial of said casing, and said blower, including said heating element and said bulb, being formed and constituted not to interrupt such swirl, and said opening being formed tubular, to cause such swirl to persist, and to cause such air to emerge from said opening swirling, such swirling being of such degree as to cause such air to emerge from said outlet substantially only about the periphery of said outlet.

24. A blower, for drying hair, comprising a casing with an opening, a fan disposed within said casing arranged to expel air through said opening, a heating element disposed within said casing in the path of such air between said fan and said opening, and an electric bulb disposed within said casing in position to throw light through said opening, said blower being formed and constituted to impart a swirl to such air and not to interrupt such swirl, and having said opening formed tubular to cause such swirl to persist, to cause such air to emerge from said opening swirling to an extent sufficient to lift the hair.

25. A blower, for drying hair, comprising a casing provided with an opening, a fan disposed within said casing arranged to impart a swirl to the air reaching said fan, and to expel such air through said opening, a heating element disposed within said casing in the path of such air between said fan and said opening, and an electric bulb disposed within said casing in position to throw light through said opening, said blower, including said heating element and said bulb, being formed and constituted not to interrupt such swirl, and having said opening formed tubular to cause such swirl to persist, to cause such air to emerge from said opening swirling to an extent sufficient to lift the hair.

26. A blower, comprising a casing provided with an outlet, and with an inlet remote from said outlet, a fan disposed within said casing arranged to draw air in through said inlet, and to impart a swirl to such air, and to expel such air through said outlet, and a heating element disposed within said casing spaced from the sides of said casing and substantially axial of said casing and in the path of such air between said fan and said outlet, said blower, including said heating element, being formed and constituted not to interrupt such swirl, and said outlet being formed tubular, to cause such swirl to persist, and to cause such air to emerge from said outlet swirling, such swirling being of such degree as to cause such air to emerge from said outlet substantially only about the periphery of said outlet.

27. A blower, comprising a casing provided with an outlet, and with an inlet remote from said outlet, a fan disposed within said casing arranged to draw air in through said inlet, and to impart a swirl to such air, and to expel such air through said outlet, a heating element disposed within said casing in the path of such air between said fan and said outlet, and an electric bulb disposed within said casing in position to throw its light through said outlet, said heating element and said bulb being spaced from the sides of said casing and substantially axial of said casing, and said blower, including said heating element and said bulb, being formed and constituted not to interrupt such swirl, and said outlet being formed tubular, to cause such swirl to persist, and to cause such air to emerge from said outlet swirling, such swirling being of such degree as to cause such air to emerge from said outlet substantially only about the periphery of said outlet.

28. A blower, for drying hair, comprising a casing provided with an outlet, and with an inlet remote from said outlet, a fan disposed within said casing arranged to draw air in through said inlet and to expel such air through said outlet, a heating element disposed within said casing in the path of such air between said fan and said outlet, and an electric bulb disposed within said casing in position to throw its light through said outlet, said blower being formed and constituted to impart a swirl to such air and not to interrupt such swirl, and said outlet being formed tubular to cause such swirl to persist, to cause such air to emerge from said outlet swirling to an extent sufficient to lift the hair.

29. A blower, for drying hair, comprising a casing provided with an outlet, and with an inlet remote from said outlet, a fan disposed within said casing arranged to draw in air through said inlet, and to impart a swirl to such air, and to expel such air through said outlet, a heating element disposed within said casing in the path of such air between said fan and said outlet, and an electric bulb disposed within said casing in position to throw its light through said outlet, said blower, including said heating element and said bulb, being formed and constituted not to interrupt such swirl, and said outlet being formed tubular, to cause such swirl to persist, and to cause such air to emerge from said outlet swirling to an extent sufficient to lift the hair.

30. A blower, comprising a casing provided with an outlet, and with an inlet remote from said outlet, an electric motor fan disposed within said casing arranged to draw in air through said inlet and to expel such air through said outlet, and an electric bulb carried by said motor and within said casing in position to throw light through said outlet, said blower being formed and constituted to impart a swirl to such air and not to interrupt such swirl, and said outlet being formed tubular to cause such swirl to persist, to cause such air to emerge from said outlet swirling, such swirling being of such degree as to cause such air to emerge from said outlet substantially only about the periphery of said outlet.

31. A blower, comprising a casing provided with an outlet, and with an inlet remote from said outlet, a fan disposed within said casing arranged to draw air in through said inlet and to expel such air through said outlet, and an electric bulb disposed within said casing spaced from the sides of said casing substantially axial of said casing and in position to throw light through said outlet, said blower being formed and constituted to impart a swirl to such air and not to interrupt such swirl, and said outlet being formed tubular to cause such swirl to persist, to cause such air to emerge from said outlet swirling, such swirling being of such degree as to cause such air to emerge from said outlet substantially only about the periphery of said outlet.

32. A blower, comprising a casing provided with an opening, an electric motor fan disposed within said casing arranged to expel air through said opening, and a heating element carried by said motor and disposed within said casing in the path of such air between said fan and said opening, said blower being formed and constituted to impart a swirl to such air and not to interrupt such swirl, and having said opening formed tubular to cause such swirl to persist, to cause such air to emerge from said opening swirling, such swirling being of such degree as to cause such air to emerge from said outlet substantially only about the periphery of said outlet.

33. A blower, comprising a casing provided with an opening, a fan disposed within said casing arranged to expel air through said opening, and a heating element disposed within said casing spaced from the sides of said casing and substantially axial of said casing and in the path of such air between said fan and said opening, said blower being formed and constituted to impart a swirl to such air and not to interrupt such swirl, and having said opening formed tubular to cause such swirl to persist, to cause such air to emerge from said opening swirling, such swirling being of such degree as to cause such air to emerge from said outlet substantially only about the periphery of said outlet.

34. A blower, comprising a casing provided with an opening, an electric motor fan disposed within said casing arranged to expel air through said opening, a heating element carried by said motor and disposed within said casing in the path of such air between said fan and said opening, and an electric bulb carried by said motor and disposed within said casing in position to throw light through said opening, said blower being formed and constituted to impart a swirl to such air and not to interrupt such swirl, and having said opening formed tubular to cause such swirl to persist, to cause such air to emerge from said opening swirling, such swirling being of such degree as to cause such air to emerge from said outlet substantially only about the periphery of said opening.

35. A blower, comprising a casing provided with an opening, a fan disposed within said casing arranged to expel air through said opening, a heating element disposed within said casing in the path of such air between said fan and said opening, and an electric bulb disposed within said casing in position to throw light through said opening, said heating element and said bulb being disposed spaced from the sides of said casing and substantially axial of said casing, and said blower being formed and constituted to impart a swirl to such air and not to interrupt such swirl, and having said opening formed tubular to cause such swirl to persist, to cause such air to emerge from said opening swirling, such swirling being of such a degree as to cause such air to emerge from said outlet substantially only about the periphery of said opening.

36. A blower, comprising a casing provided with an outlet, and with an inlet remote from said outlet, a fan disposed within said casing arranged to draw air in through said inlet and to expel such air through said outlet, and a heating element disposed within said casing spaced from the sides of said casing and substantially axial of said casing and in the path of such air between said fan and said outlet, said blower being formed and constituted to impart a swirl to such air and not to interrupt such swirl, and having said outlet formed tubular to cause such swirl to persist, to cause such air to emerge from said outlet swirling, such swirling being of such degree as to cause such air to emerge from said outlet substantially only about the periphery of said outlet.

37. A blower, comprising a casing provided with an outlet, and with an inlet remote from said outlet, a fan disposed within said casing arranged to draw air in through said inlet and to expel such air through said outlet, a heating element disposed within said casing in the path of such air between said fan and said outlet, and an electric bulb disposed within said casing in position to throw its light through said outlet, said heating element and said bulb being disposed spaced from the sides of said casing and substantially axial of said casing, and said blower being formed and constituted to impart a swirl to such air and not to interrupt such swirl, and said outlet being formed tubular to cause such swirl to persist, to cause such air to emerge from said outlet swirling, such swirling being of such degree as to cause such air to emerge from said outlet substantially only about the periphery of said outlet.

In testimony whereof I hereunto affix my signature.

WENDELL L. MARTIN.